(12) United States Patent
Gros

(10) Patent No.: US 10,520,916 B1
(45) Date of Patent: Dec. 31, 2019

(54) CONTROL SYSTEMS

(71) Applicant: Richard A. Gros & Associates, Inc., Corona, CA (US)

(72) Inventor: Richard A. Gros, Corona, CA (US)

(73) Assignee: Richard A Gros & Associates, Inc., Corona, CA (US)

( * ) Notice: Subject to any disclaimer, the term of this patent is extended or adjusted under 35 U.S.C. 154(b) by 135 days.

(21) Appl. No.: 15/904,191

(22) Filed: Feb. 23, 2018

Related U.S. Application Data

(63) Continuation-in-part of application No. 15/169,333, filed on May 31, 2016.

(60) Provisional application No. 62/462,810, filed on Feb. 23, 2017, provisional application No. 62/168,924, filed on Jun. 1, 2015.

(51) Int. Cl.
*G05B 19/404* (2006.01)

(52) U.S. Cl.
CPC .. *G05B 19/404* (2013.01); *G05B 2219/41174* (2013.01)

(58) Field of Classification Search
CPC .............. G05B 19/41885; G05B 15/02; G05B 2219/39214; G05B 19/404; G05B 2219/41174
USPC .......................................................... 700/54
See application file for complete search history.

(56) References Cited

U.S. PATENT DOCUMENTS

| | | | | |
|---|---|---|---|---|
| 2002/0176201 A1* | 11/2002 | Hsin | ..................... | G11B 5/5552 360/78.05 |
| 2009/0219646 A1* | 9/2009 | Ishihara | ............. | G11B 5/59622 360/75 |
| 2010/0207594 A1* | 8/2010 | Davoudi | ............... | H02M 3/157 323/283 |
| 2010/0217790 A1* | 8/2010 | Yang | .................. | H03H 17/0277 708/313 |
| 2010/0268353 A1* | 10/2010 | Crisalle | ................ | G05B 13/048 700/29 |
| 2014/0018940 A1* | 1/2014 | Casilli | .................... | G05B 15/02 700/29 |

* cited by examiner

*Primary Examiner* — Kenneth M Lo
*Assistant Examiner* — Michael W Choi
(74) *Attorney, Agent, or Firm* — Vista IP Law Group LLP; William A English

(57) ABSTRACT

Systems and methods are provided for designing a compensator for controlling a plant and to control systems for such plants. In one embodiment, a compensator may be designed by introducing a predetermined input into the plant; measuring an impulse response of the plant responding to the predetermined input; determining a mathematical model for the plant based at least in part on the impulse response of the plant, the model comprising a first ratio of polynomials (the plant model) including a first set of coefficients; and determining a second ratio of polynomials including a second set of coefficients (the compensator) based at least in part on the first set of coefficients to operate the compensator such that the compensator produces a series of plant inputs to move the plant towards a setpoint according to a predetermined plant output.

20 Claims, 9 Drawing Sheets

CONTROL SYSTEMS

RELATED APPLICATION DATA

The present application claims benefit of provisional application Ser. No. 62/462,810, filed Feb. 23, 2017, and is a continuation-in-part of co-pending application Ser. No. 15/169,333, filed May 31, 2016, which claims benefit of provisional application Ser. No. 62/168,924, filed Jun. 1, 2015, the entire disclosures of which are expressly incorporated by reference herein.

FIELD OF THE INVENTION

The present invention relates to systems and methods for controlling a plant, and more particularly to systems and methods for designing a compensator for a control system based, at least in part, on determining characteristics of the plant.

SUMMARY

The present invention is directed to systems and methods for controlling a plant, such as an electrical and/or mechanical system, an industrial system, such as a chemical or nuclear plant, and/or other systems or processes. More particularly, the present invention is directed to systems and methods for designing a compensator for a control system for a plant based, at least in part, on determining characteristics of the plant, e.g., during operation of the plant or prior to deployment of the system.

In an exemplary embodiment, the systems and methods herein may allow the design of a compensator to control a plant and, as a result, an accurate plant model may be determined. Overshoot and oscillation may be controlled, or for all practical purposes, eliminated. The compensator may be adaptive (e.g., adjusting to varying system loads; systems that change with time or temperature, and/or other factors known or unknown; adjusting to an unknown system and changing system, such as a lung). The compensator may be recomputed in real-time, in situ, without disturbing system operation. Alternatively, the compensator may be substantially permanently set before deployment of the plant, e.g., during manufacturing and/or testing, e.g., if the performance of the plant during regular operation is expected to be substantially stable.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

As used herein, the following terms are used consistent with the definitions listed below (in the context of control systems):

convolution=polynomial multiplication, also represented by "*" in this context;
deconvolution=polynomial division, also represented by "/" in this context;
IR=impulse response;
SR=step response;
LTI=linear time-invariant;
in situ=in system, in place;
plant=the thing we are trying to control, which includes the "load";
x=actual or desired plant input values;
y=actual or desired plant output values;
dy=derivative of y;
setpoint=the commanded plant output;
feedback=the actual (measured) plant output at runtime;

error=setpoint−feedback;

compensator=uses error and some knowledge of plant behavior to produce a series of plant inputs that will move the plant towards the setpoint in a way consistent with design goals;

Smoothstep: $S(t)=3t^2-2t^3$;

Sigmoid $S(t) = \frac{1}{1 + e^{-t}}$.

Figure 1:
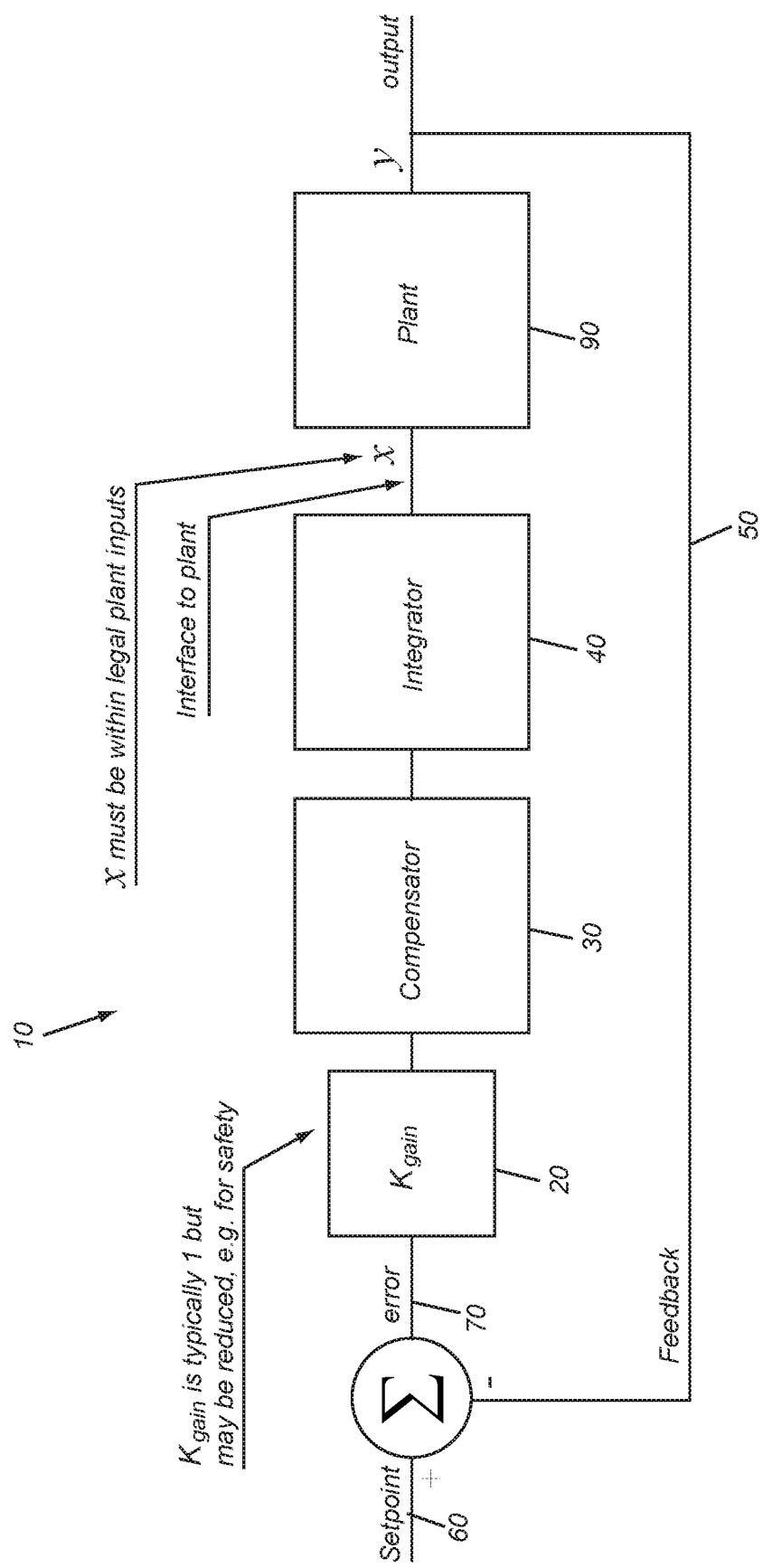
FIG. 1 is a flow chart showing an exemplary embodiment of a control system for a plant.

Turning to FIG. 1, an exemplary embodiment of a control system 10 is shown for controlling a plant 90. As can be seen, the system 10 generally includes a Gain Constant, $K_{gain}$, 20, a compensator 30, and an integrator 40 providing an input x into the plant 90, resulting in an output y. Feedback 50 is provided from the output y back to the setpoint 60 to determine the error 70, as explained further elsewhere herein. The system 10 allows a compensator 30 to be designed to control the plant 90 based, at least in part, on characteristics of the plant 90, e.g., based on an actual impulse response $IR_{plant}$ determined based on one or more outputs y of the plant 90 given one or more corresponding inputs x, or determined by some other method, such as mathematical modeling, if desired.

Figure 2:
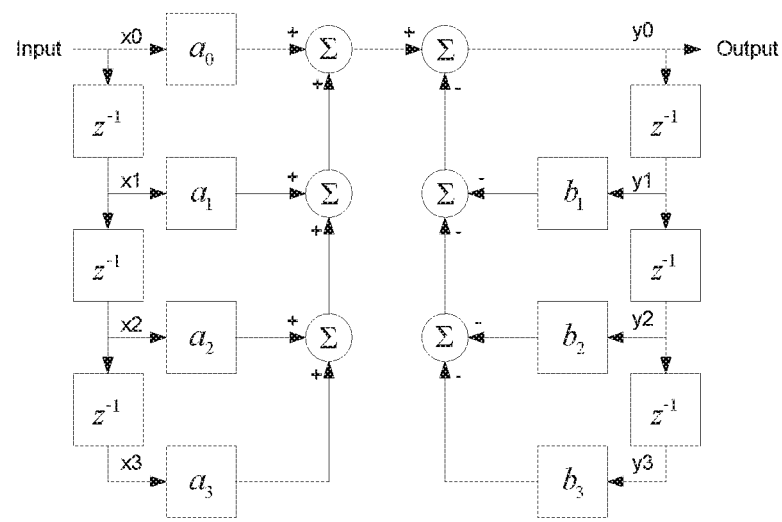
FIG. 2 is an exemplary embodiment showing a template of a digital compensator implementation structure, which is extensible to more or fewer coefficients in both a and b.

FIG. 2 shows an exemplary embodiment of digital compensator implementation structure template that may define the compensator 30. In this embodiment, the compensator 30 includes a set of compensator coefficients (represented by the a and b coefficients shown, although the actual number of coefficients may be set based on the desired performance of the system, e.g., sixteen, sixty four, and the like). In one embodiment, the compensator 30 may be adaptive, e.g., adjust to varying system loads; systems that change with time or temperature, or other factors known or unknown; adjust to an unknown system and changing system, such as a lung). In addition or alternatively, the compensator coefficients can be recomputed in real-time, in situ without disturbing system operation. For example, the system may determine a new set of compensator coefficients, e.g., periodically, based on predetermined events, or time, or changes, and the like. Alternatively, the system may set the compensator upon initial operation of the plant and maintain the compensation coefficients indefinitely for future operation, or may reset the compensator each time the plant is turned on, and the like.

Further, the x inputs and y outputs represent inputs to the block and the outputs of the block. Basically this structure is a "basic building block; an implementation structure" that may implement a compensator, or represent a plant or any intermediate step. Therefore, x and y are used generally to describe inputs and outputs for the block, regardless of the role that the block is playing. For example, the error term is the x input to the gain block. The y output of the gain block becomes the x input to the compensator block. The y output of the compensator block becomes the x input to the integrator block. The y output of the integrator block becomes the x input to the plant block, and so on.

As further explanation, the block actually implements three mathematical functions: gain, convolution and deconvolution (aka transfer function). It is possible to have only convolution (in which case there will only be a coefficients, or deconvolution (in which case there will only be b coefficients), or both convolution and deconvolution (in which case there will be both a and b coefficients).

In the example of gain only, there will be a single a coefficient.

In the example of gain and convolution, the gain constant may multiply all the a coefficients to get a new set of a coefficients:

Basically, the block is implementing a ratio of two polynomials, and anything in the numerator represents convolution, and anything in the denominator represents deconvolution. Here is an example of the computations that may be used:

Suppose we have the following transfer function:

$$H(z) = k_{zgain} \frac{(z-e^{-z_1 T})(z-e^{-z_2 T})(z-e^{-z_3 T})(z-e^{-z_4 T})}{(z-e^{-p_1 T})(z-e^{-p_2 T})(z-e^{-p_3 T})(z-e^{-p_4 T})} \quad (1)$$

When we multiply equation (1) out, we get the following:

$$H(z) = \frac{Y(z)}{X(z)} = \frac{c_0 z^3 + c_1 z^2 + c_2 z^1 + c_3 z^0}{d_0 z^3 + d_1 z^2 + d_2 z^1 + d_3 z^0} \quad (2)$$

where Y(z) represents the output, X(z) represents the input, and H(z) represents the transfer function.

While the coefficient subscripts appear to be numbered in an unconventional fashion, if we persevere with this notation, the actual processor implementation makes more sense. This point will become clear below. Y(z), X(z), and H(z) are essentially sequences of discrete values in time. Positive exponents of z represent future values, zero exponents of z represent present values, and negative exponents of z represent past values.

In a real-time implementation, future values are unknown, and the system may divide through by the highest power of z to reference only present and past values.

$$\frac{Y(z)}{X(z)} = \frac{c_0 + c_1 z^{-1} + c_2 z^{-2} + c_3 z^{-3}}{d_0 + d_1 z^{-1} + d_2 z^{-2} + d_3 z^{-3}} \quad (3)$$

All coefficients may then be normalized by dividing through by $d_0$:

$$\frac{Y(z)}{X(z)} = \frac{\frac{c_0}{d_0} + \frac{c_1}{d_0} z^{-1} + \frac{c_2}{d_0} z^{-2} + \frac{c_3}{d_0} z^{-3}}{1 + \frac{d_1}{d_0} z^{-1} + \frac{d_2}{d_0} z^{-2} + \frac{d_3}{d_0} z^{-3}} \quad (4)$$

The constant notation may then be changed as follows:

$$\frac{Y(z)}{X(z)} = \frac{a_0 + a_1 z^{-1} + a_2 z^{-2} + a_3 z^{-3}}{1 + b_1 z^{-1} + b_2 z^{-2} + b_3 z^{-3}} \quad (5)$$

Cross multiply:

$$Y(z)(1+b_1 z^{-1}+b_2 z^{-2}+b_3 z^{-3})=X(z)(a_0+a_1 z^{-1}+a_2 z^{-2}+a_3 z^{-3}) \quad (6)$$

Solve for Y(z):

$$Y(z)=X(z)(a_0+a_1 z^{-1}+a_2 z^{-2}+a_3 z^{-3})Y(z)(b_1 z^{-1}+b_2 z^{-2}+b_3 z^{-3}) \quad (7)$$

Take inverse z-transform:

$$y[0]=a_0 x[0]+a_1 x[1]+a_2 x[2]+a_3 x[3]-b_1 y[1]-b_2 y[2]-b_3 y[3] \quad (8)$$

where y[0] is the current output, y[1] is the previous output, and x[0] is the current input, x[1] is the previous input.

In the processor implementation, this notation conveniently matches array subscript notation, where higher subscripts indicate older data in the history buffer. Now it becomes obvious that we can apply constant $a_0$ to input x[0], $a_1$ to input x[1], and so on.

This notational scheme directly matches the block diagram (implementation structure template) shown in FIG. 2, where $z^{-1}$ denotes a 1-unit delay. Note that the lead coefficient $b_0$ becomes one (1) when divided through. This is the traditional approach and is done to eliminate one multiply-accumulate step in the computation—multiplying anything by "1" gives you what you started with, so the system may simply skip this step. Alternatively, the system may include a set of b coefficients in which $b_0$ is something other than one (1).

Again the exemplary implantation structure shown in FIG. 2 may represent any block: gain, compensator, integrator, plant—every block is made up from this general structure.

For example, with respect to the gain block 20, this may consist of a single coefficient $a_0$ with nothing in the denominator.

A compensator block would typically contain both a numerator and a denominator, e.g., as shown in FIG. 2.

A plant model block may typically consist of numerator coefficients only (a single polynomial in z) or a single a coefficient and denominator coefficients, although alternatively a ratio of two polynomials may be used as an approximation. This is literally the $IR_{plant}$.

As in FIG. 1, these blocks are cascaded together. Blocks may be rearranged in different order, or combined or manipulated in any way. For example, all of the mathematical expressions ultimately combine together, so that all the numerator polynomials multiply together (representing convolution), and all the denominator polynomials multiply together (representing deconvolution).

Initially, the system 10 may characterize the plant 90, which may be accomplished by a variety of methods (e.g., modeling, measurement, and the like) to get the $IR_{plant}$. One method is to measure the $IR_{plant}$ in situ by collecting a plurality of inputs x to the plant 90 and the resulting outputs y from the plant 90 and deconvolving or using a matrix solver to get the $IR_{plant}$. For example, the $IR_{plant}$ may be determined as a polynomial or ratio of polynomials including a set of coefficients (e.g., such as the coefficients shown in FIG. 2). The advantage of doing in situ measurement is that all system effects (e.g., known, unknown, expected, unexpected, component value variation, parasitics, temperature effects, aging effects, etc.) are being measured and accounted for and there is no need to model, predict, analyze, and/or understand the effects. The system 10 simply determines the real, actual $IR_{plant}$ of the plant 90. Another advantage of in situ measurement is that it may be performed on-the-fly, in real-time, without disturbing system operation—the system remains operational while the measurement is being performed.

Note that the basis for this operation comes from principles of superposition in control system theory, which leads to the following relationship:

$$x * IR_{plant} = y \quad (9)$$

where x and $IR_{plant}$ are known, and y is being computed by convolution. However, if x and y are known, we can compute $IR_{plant} = y/x$ by deconvolution (the inverse operation).

In addition, superposition is only true for LTI (linear) systems. An example of a linear system is a buck converter, where $$\frac{V_{out}}{V_{in}} \approx D.$$

An example of a non-linear system is a boost converter, where $$\frac{V_{out}}{V_{in}} \approx \frac{1}{1-D}.$$

However, non-linear systems may be linearized by direct computation (although such processes may be difficult on a relatively small processor) using curve-fit, or table-lookup, or other method.

After the $IR_{plant}$ has been determined, the system 10 may use the resulting characteristics to provide an effective system model of the plant 90. This determination is then used in building the compensator 30, as described further below. For example, a compensator may be designed to meet one or more desired design goals, such as overshoot, oscillation, time to reach percent of desired output, frequency response, shape of plant input values, shape of plant output values, and the like.

As with conventional feedback systems, the integrator 40 may be used to eliminate steady-state error. With this in mind, the structure of a closed-loop feedback control system can be described as:

$$\text{error} * K_{gain} * IR_{compensator} * \text{integrator} * IR_{plant} = y = \text{desired plant output} \quad (10)$$

or $$IR_{compensator} = dy/IR_{plant}/\text{error}/K_{gain} \quad (11)$$

Where $K_{gain}$ is an optional constant, which we initially assume to be one (1) for the purposes of computing $IR_{compensator}$ and thereafter may choose a value less than one (1) (e.g., for safety or other purposes), which may be used to control overshoot, provide a de-rating safety factor, and/or control input range x, etc.

Note one limitation: in the following relation, plant input=x=error*$K_{gain}$*$IR_{compensator}$*integrator, x must be within the valid input range of the plant.

Equation (11) allows the system's designer to define the desired plant output, which may be an exponential, but may be any arbitrary function (e.g., any desired sequence of plant output values), and then equation (11) may be used to determine the $IR_{compensator}$ that will deliver the desired output.

Similarly, the system's designer may define the desired plant input, which may be exponential, but may be any arbitrary sequence of plant input values, then apply equation (9) to determine an "implied" desired plant output, then apply equation (11) to determine the $IR_{compensator}$ that will deliver the desired input.

If the system has an $IR_{plant}$, essentially a polynomial or ratio of polynomials, and convolves by the reciprocal of that same polynomial, or ratio of polynomials in the compensator 30, it cancels and vanishes (e.g., it becomes the constant one with a phase shift of one step). It doesn't matter what the polynomial or ratio of polynomials is since any expression multiplied by or convolved with its inverse will produce the same answer, namely the constant one (1) with a phase shift of one step.

We can then focus on the desired output sequence coming out of the plant and generally forget about the plant. However, as explained above, one limitation is that the input x to the plant must within the valid input range of the plant 90. Now, if the desired output parameter is "let y=a pure exponential," then the frequency response plot (aka Bode plot) will show that the system now has a frequency response of a low-pass filter.

However, this is true if the goal is for the plant output to be a pure exponential. If, instead, the plant is a mechanical system and one of the goals is to control acceleration and/or jerk (the derivative of acceleration), the desired plant output may be a Sigmoid, Smoothstep, or any arbitrary desired output. Equation (11) determines the $IR_{compensator}$ that will produce this desired plant output. Additionally, if we use these methods to manage plant inputs and/or outputs, a less-capable plant may be used, possibly resulting in a cost reduction.

Alternatively, if the plant input sequence, rather than plant output, is the desired focus of the system (e.g., for a motor or some mechanical device), the system may start with the desired plant input sequence x, convolve with the $IR_{plant}$ to get the desired plant output sequence y (which is really a function of the plant input x), then equation (11) above is used to compute the $IR_{compensator}$ to get the "implied" desired plant output y, which results in getting the desired plant input x.

In addition, in some embodiments, the system may be "invertible" or nearly so. This means that $1/IR_{plant}$ is a converging sequence. With such a system, the system may use $K_{gain}$ to keep x within bounds, or limit error so that x remains within bounds. With these systems, with $K_{gain}=1$ and small enough error, a desired control system may be achieved: the output is equal to the input with one step of phase shift. Note that there is an implication here that if you want this capability, enhancing the capabilities of the plant, or using a nominal setpoint that allows a less obstructed range of movement of x (the plant input) will allow for larger error inputs.

By simply using error limiting, the system may achieve higher performance. Examples of this are described further below.

In another exemplary embodiment, if one of the goals is to design a reasonably fast system, then the system may use setpoint tracking to get the plant to produce any desired output with a small or negligible phase delay. For example, if the plant is a ventilator or other device including a lung and a blower (not shown), the system may use Smoothstep over several seconds to control airway pressure. The resulting control system (may be running at 20 kHz) may be designed to be very tight and responsive, and then the system may use setpoint control input to command the Smoothstep profile. For a very responsive system, using setpoint tracking over seconds, the phase delay is essentially zero (or close enough not to matter). Alternatively, any number of breath profiles may be possible: Smoothstep, exponential, trapezoid, Sigmoid, sine, multi-step, triangle, or any arbitrary sequence.

In another embodiment, the system may use multiple sets of compensator coefficients to use under different conditions or for different performance goals. Consequently, it may be possible to switch coefficients on cue. For example, suppose that the system receives advance notice that a load change is coming, the system may replace a first set of compensator coefficients (based on the original load) with a second set of compensator coefficients (based on the new load). The system may then operate immediately using the new coefficients that are optimized for the new load.

Another potential advantage of providing a very accurate plant model is a direct output of these techniques (via in situ measurement and deconvolution). This allows the system or its designers to ask questions like "given this sequence of inputs, what will the plant output sequence look like?" and then predict actual behavior of the plant, e.g., by producing a plot of the inputs and outputs and visualize the actual (modeled) behavior.

Another potential advantage of the systems and methods herein is that they may be used to control or eliminate overshoot and oscillation, by specifying a desired system output y, and/or by adjusting the gain control $K_{gain}$.

Another potential advantage of the systems and methods herein is that they may be used in situ, on-the-fly, to compute a new compensator and/or $K_{gain}$, and/or adjust the $K_{gain}$, only. This makes the system adaptive, which is useful for systems that may change over time, or loads that may change, or a compensator that must adapt to different unknown systems (such as a lung).

Example 1: in an exemplary embodiment in which the system includes a power supply as the plant, the system may characterize itself and compute a new compensator during power up (or maybe whenever there was a step change in the load). This may allow the compensator to account for component tolerances, temperature effects, and aging effects. The compensator may also be optimized for the load (or re-optimized when the load changes).

Example 2: in another exemplary embodiment, the system may include a ventilator as the plant that needs to work with a wide range of lung types, e.g., big lungs, small lungs, stiff lungs, soft lungs, restrictive airway, unrestrictive airway, different patient circuits, leaky mask, tight mask, and the like. Such a system may characterize itself on every breath and modify the compensator to match the conditions of the moment (e.g., determining the $IR_{plant}$ and the resulting compensator coefficients based on some time interval, or based on breath cycles, and the like). As a result, this system may handle the situation where a mask leak might change, the patient changes position and impacts lung or patient circuit characteristics, and/or other changing circumstances.

Note that it is possible and often desirable to manipulate the processing involved to reduce (or increase) the number of coefficients in the actual implementation of the compensator, which directly relates to the amount of computational effort required by the processor at runtime. Such alternatives are intended to fall within the scope of the systems and methods herein. It may also be possible to substitute one or more approximations for any portion of the processing and still fall within the scope of the systems and methods herein. It may also be possible to manipulate, reorder, and/or combine some or all of the calculations performed by the system to simplify, or even intentionally obfuscate within the scope of the systems and methods herein.

Examples of Alternate Implementations

Various alternative systems and methods may also be provided. For example, if it were discovered that instead of convolving $IR_{compensator}$ there are fewer coefficients by inverting and deconvolving, then this would be considered equivalent and possibly desirable.

In another alternative, if a suitable approximation of an IR were found, e.g., as a ratio of two polynomials (or some other method), so that the number of computations is reduced, then this would be considered equivalent and possibly desirable. Note that it may be possible to use an approximation that uses more, less, or the same number of computations, and this would also be considered equivalent. In the case of an approximation with fewer computations, this may be especially useful (e.g., less work for the processor) for either convolving the $IR_{compensator}$ or deconvolving the $IR_{plant}$ when computing x (the plant input sequence).

In another alternative, the integrator may be combined with the reciprocal of the $IR_{plant}$ so that we are convolving by the combination of (integrator/$IR_{plant}$). Any time that the integrator is combined with any other coefficients, the system designer should be mindful of integrator leak, which happens when a zero input results in an increasing or decreasing integrator output. Ideally, an integrator should hold its value indefinitely when presented with a zero input. If integrator leak is a concern, then the system may take steps to correct for this.

In another embodiment, one or more constants may be applied to the system in addition to or instead of $K_{gain}$ 20 in the system 10. In addition or alternatively, the order of operations performed by the system may be modified as desired.

In another embodiment, it may be desirable to normalize the denominator coefficients (of the deconvolution performed by the compensator) such that $b_0$ is one (1), but this is not a requirement. Instead, $b_0$ may be set to other values than one (1), as desired.

Similarly, it may be desirable to normalize the numerator coefficients (of the convolution performed by the compensator) such that the a coefficients include the gain constant $K_{gain}$. However, other values may be used if desired. For example, coefficients may be modified as desired, e.g., by multiplying by a polynomial over here and then dividing by a polynomial over there. Further, inverting portions of the calculations and then using inverse operations may also be performed if desired. Pre-combining or manipulating the calculations may also be performed is desired. For example, in the compensator, it may be possible to invert the $IR_{compensator}$ and convolve with the $IR_{plant}$ in the denominator to get a new combined denominator. This would be equivalent to manipulating a=b/c to the form a=1/(1/b*c).

Deconvolving by a shifted $IR_{plant}$ is also possible, and may generate a plant output that may be substantially exponential. Regardless of the resulting plant output, the system can deal with this case as having specified the plant inputs, convolving with the known $IR_{plant}$ to get an "implied" desired plant output, and then apply equation (11) above (same as we do for any arbitrary desired plant output) to determine the $IR_{compensator}$ that generates this output.

However, some $IR_{plant}$ are not invertible. As a solution, it is possible to use a $b_0$ coefficient that is arbitrary and large enough such that the reciprocal converges.

Any conventional manipulation of the calculations to those described herein is considered equivalent, regardless of whether or not an approximation is used, regardless of whether or not the number of coefficients is more, same, or fewer, regardless of how the coefficients are combined, regardless of how portions of the math might be pre-computed, regardless of how any portion of the math can be inverted and moved from numerator to denominator, or from denominator to numerator, regardless of the sequence of operations, regardless of the implementation structure, regardless of whether or not the method is intentionally obfuscated, or obfuscated by happy accident.

Exemplary Systems

Figure 4A:
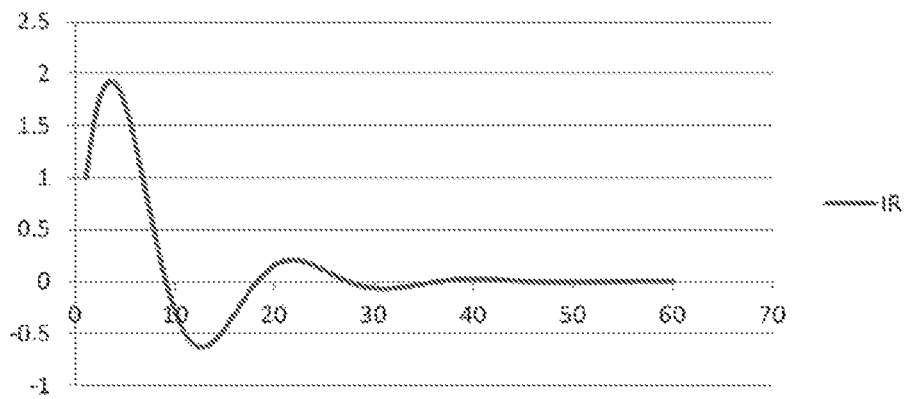
FIGS. 4A-4J are charts showing exemplary plants and outputs using various compensators.
Figure 4B:
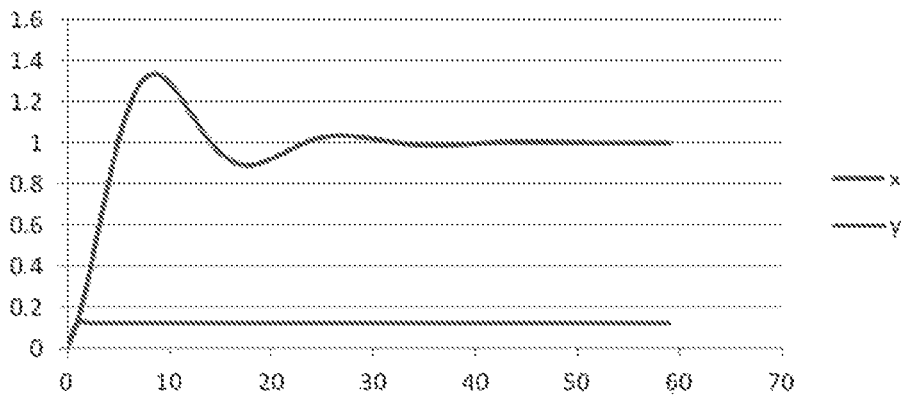

The basic system used in the following examples is from a TI UCD9112 digital power design workshop. The plant characteristics were given, and the exercise was to construct a compensator to control the plant. The IR for this plant (based on mathematical modeling) is shown in FIG. 4A. The step response for this plant is shown in FIG. 4B. The overshoot is 33%.

Figure 4C:
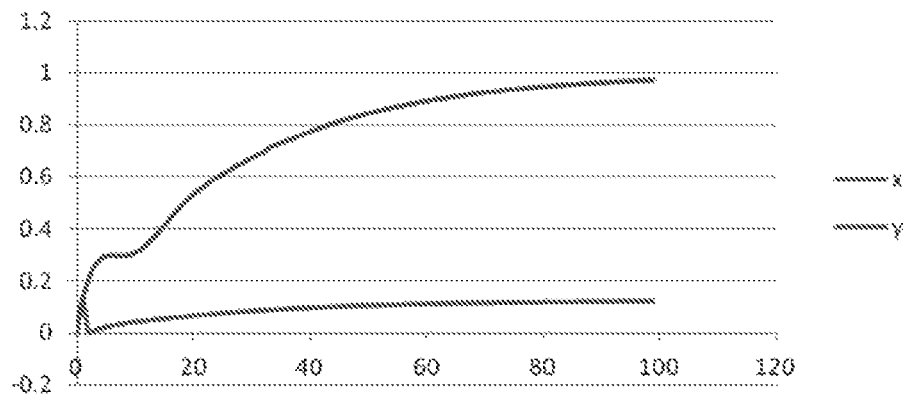

The workshop proposed using a complex zero and an integrator to compensate the plant. To compare compensation techniques, the gain in the workshop design example has been adjusted so that the output of the compensator was restricted to legal inputs to the plant (not less than 0% and not more than 100%), and the plant output does not exceed 100%, as shown in FIG. 4C. After adjusting the gain so that we may compare compensation techniques, there is no overshoot or oscillation. The number of steps to reach 90% of final output is 62 steps. Side note: it is possible to have a plant with negative inputs, such as a linear actuator. In such cases, the legal plant input would be not less than −100% and not more than 100%.

Figure 4D:
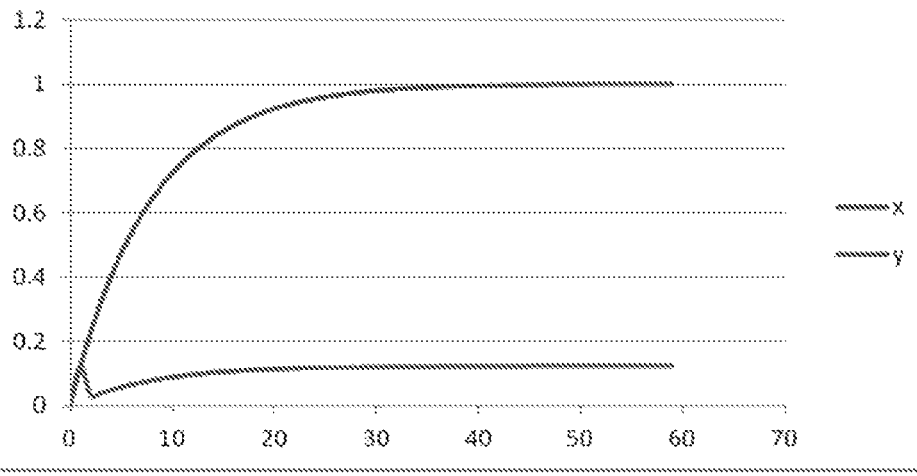

FIG. 4D shows an example of exponential plant output reaching 90% of final value in eighteen (18) steps using the systems and methods described herein, i.e., where the compensator is determined based on the actual characteristics of the plant, e.g., the $IR_{plant}$, as described elsewhere.

Compared to the workshop example (90% in 62 steps), this is a much faster system (more than three times faster). Thus, the systems and methods herein may be able to determine the plant characteristics on-the-fly, in-system, in real-time, without disturbing or altering the operation of the system. The system may automatically construct a matching compensator on-the-fly, and automatically tune the gain so that the output of the plant has no overshoot or oscillation. Further, if the plant changes during operation, the system may detect and/or report the changes, and a new matching compensator may be automatically (or upon instruction) constructed and tuned for no overshoot or oscillation.

Figure 4E:
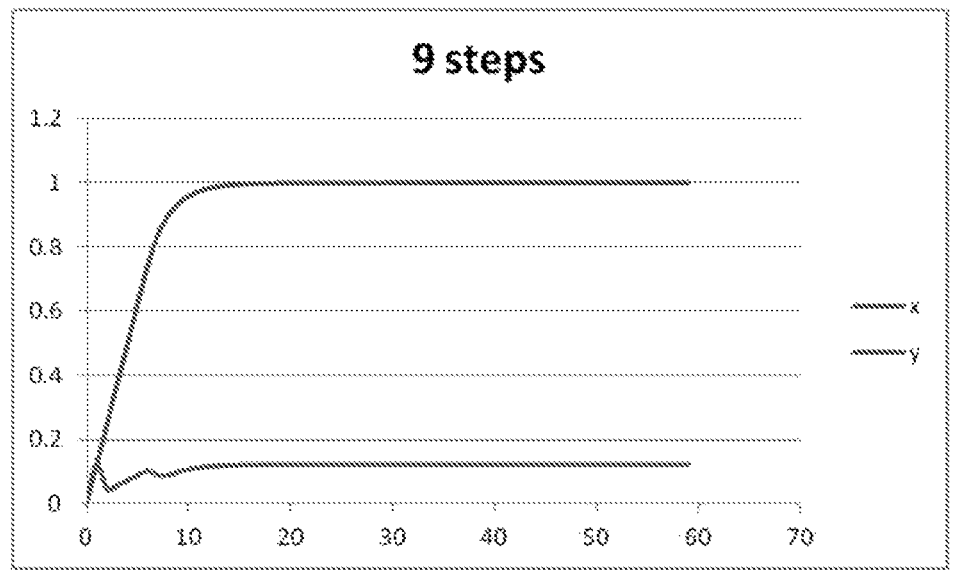

FIG. 4E shows the next example of the same system using setpoint error limiting.

Compared to the workshop example (90% in 62 steps), this is a much faster system (more than six times faster).

Figure 4F:
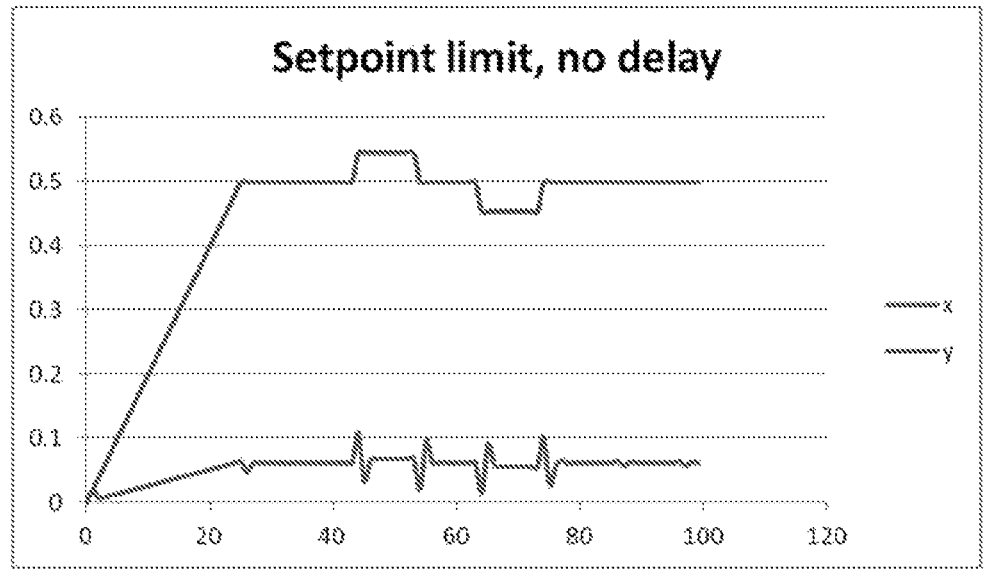

If the system can tolerate operating at the midpoint and limiting the error to 9.42% (for this specific example workshop plant), then the system may be able to achieve 100% of the commanded setpoint change with substantially no delay (i.e., the setpoint is reached in the next step), as shown in FIG. 4F. The implication is that if the capabilities of the plant are enhanced, the system can achieve higher performance. Conversely, if we use these methods to manage plant inputs and/or outputs, the capabilities of the plant may be intentionally reduced, possibly resulting in a cost reduction and/or reliability enhancement or other possible advantages.

Figure 4G:
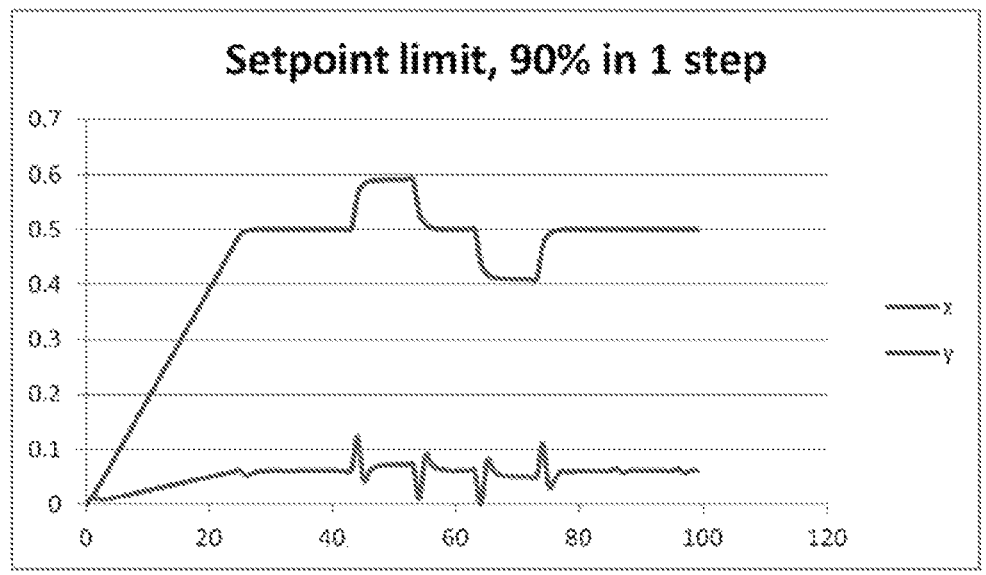

If the system can tolerate operating at the midpoint and limiting the error to 18.04% (for this specific example workshop plant), then the system may be able to achieve 90% of the commanded setpoint change with one additional step delay, as shown in FIG. 4G.

Figure 4H:
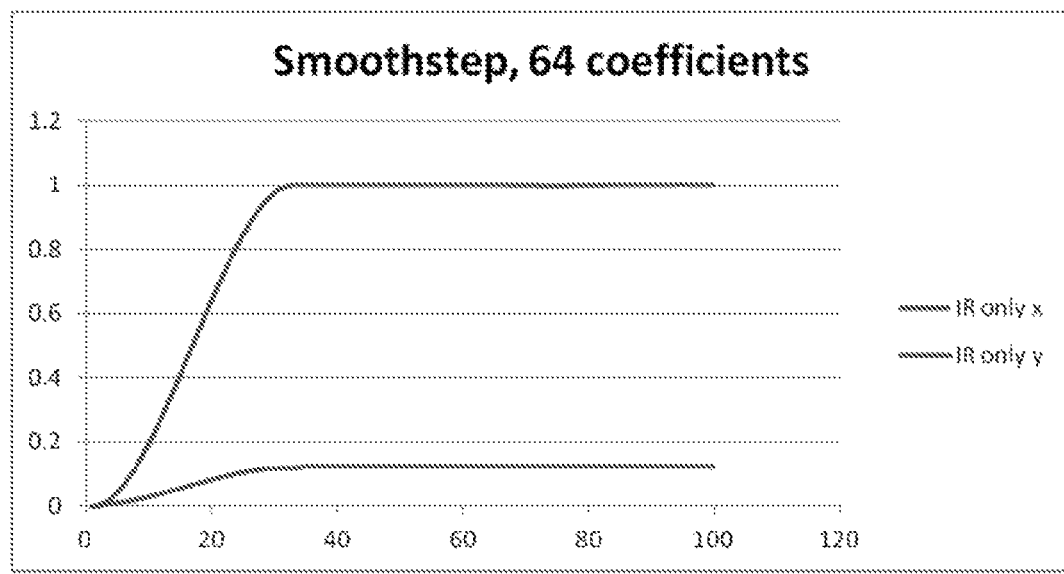

FIG. 4H shows an example of arbitrary plant output using Smoothstep with sixty four (64) coefficients to implement desired plant output, 0.07% overshoot.

Figure 4I:
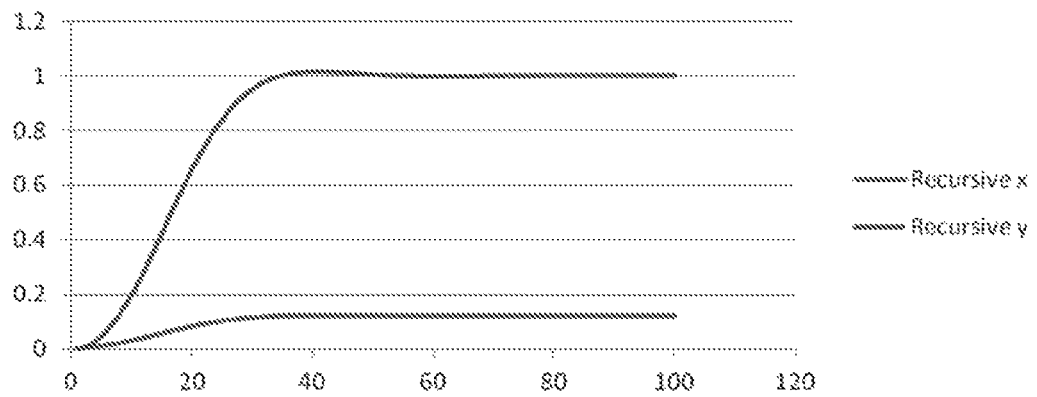

FIG. 4I shows an example of arbitrary plant output using Smoothstep approximation with sixteen (16) coefficients to implement desired plant output, 1.43% overshoot.

Figure 4J:
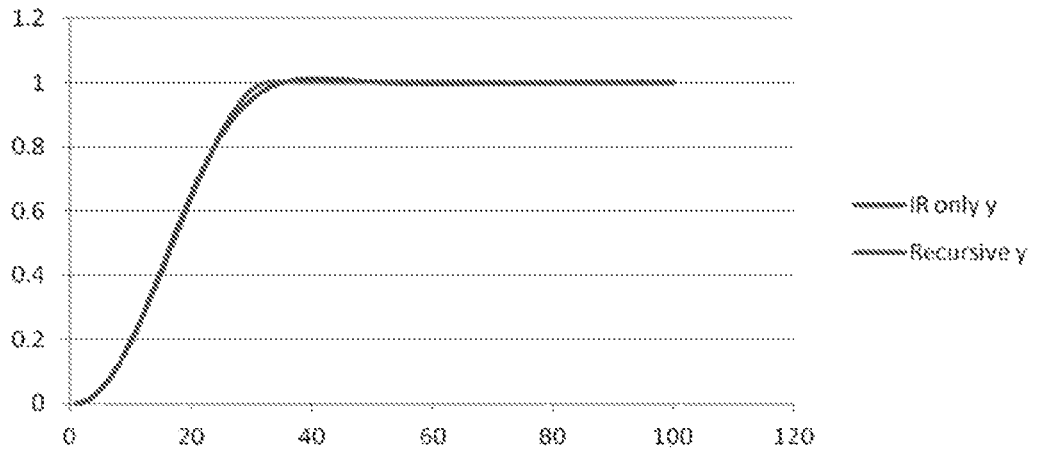

FIG. 4J shows an example of arbitrary plant output comparing Smoothstep with 64 coefficients to Smoothstep approximation with 16 coefficients.

Mechanical systems may need the ability to limit rate of change to control acceleration, jerk, smoothness, quietness, or other constraints. Similar limiting may apply to electrical systems, or systems that combine both electrical and mechanical.

The systems and methods herein may be applied to build compensators that achieve a desired plant output or a desired plant input that meet these design goals, and then automatically tune the gain to eliminate overshoot and oscillation.

In addition, the systems and methods herein may be used to identify the characteristics of an unknown system. For electrical systems, this may inherently include resistance, capacitance, inductance and so on. For mechanical systems, this may include the mechanical analog of resistance, capacitance, and inductance, such as masses, springs, friction, momentum, and so on. Systems may include both electrical and mechanical components, plus all other unknown effects in the physical system. The systems and methods herein may properly identify the system characteristics and create a matching compensator that is properly tuned to eliminate overshoot and oscillation and limit plant rate of change.

This is notably different from the "one-size-fits-all" compensator design approach, where a single compensator is designed to work "fairly well" across a wide range of varying plant conditions.

One of the byproducts of the systems and methods herein is a really excellent system model. Having this model allows designers to generally model the system so they can see step response and ask questions like "what does the plant do with these arbitrary inputs." All the plots presented as examples herein were generated by this method of system modeling.

In addition, the systems and methods herein may be used to identify a "system signature" for a plant. For example, the plant may be considered a "black box" with an arbitrary (but known) stimulus and an expected output response. It is not strictly necessary to know what is inside the plant, but if the system gives the plant the known stimulus and gets a different response, the system may determine that something inside the plant has changed. There may be some allowable tolerance for variation in the performance of the plant, but at some point, the system may determine that the change in response is significant and may indicate that something is wrong, e.g., one or more components have failed or otherwise impacted proper performance of the plant. Alternatively, the system may determine that the change in response is significant and conclude that the plant should be re-characterized and construct a new matching compensator.

One example may be component value changes in a power supply or its load, due to temperature and/or component aging or other factors. In this case, the system may elect to re-characterize the system and construct a new compensator to match the new plant characteristics. If the system detects a sudden change in the system signature, as may be the case with outright component failure, the system may elect to shut the plant down and/or provide a notification to users of the plant. Such monitoring may be analogous to monitoring motor bearings for early warning of bearing failure or checking a CRC computation on a packet of data. These are all examples of "system signatures" that may be used as a baseline reference for detecting changes or component failure in a system. These techniques may also be used to determine degrees of change to allow for operation within a normal expected range, and also raise a flag when the system signature is outside the normal expected range as compared to the baseline reference signature.

When approximations are desired, one approach may be to use the standard least-squares curve fit, although other methods may be suitable. One example of building an approximation for the implementation structure in FIG. 2 follows. Assume the x inputs are known, and the y outputs are known. Then the implementation structure shown in FIG. 2 would result in the following linear equations:

$$
\begin{aligned}
y0 &= a_0 x_0 \\
y1 &= a_0 x_1 + a_1 x_0 & -b_1 y_0 \\
y2 &= a_0 x_2 + a_1 x_1 + a_2 x_0 & -b_1 y_1 - b_2 y_0 \\
y3 &= a_0 x_3 + a_1 x_2 + a_2 x_1 + a_3 x_0 & -b_1 y_2 - b_2 y_1 - b_3 y_0 \\
y4 &= a_0 x_4 + a_1 x_3 + a_2 x_2 + a_3 x_1 & -b_1 y_3 - b_2 y_2 - b_3 y_1 \\
y5 &= a_0 x_5 + a_1 x_4 + a_2 x_3 + a_3 x_2 & -b_1 y_4 - b_2 y_3 - b_3 y_2 \\
y6 &= a_0 x_6 + a_1 x_5 + a_2 x_4 + a_3 x_3 & -b_1 y_5 - b_2 y_4 - b_3 y_3 \\
\ldots
\end{aligned} \quad (12)
$$

Arrange into matrix form, where $x_i$ and $y_i$ on the right hand side make up the coefficient matrix A, the $a_i$ and $b_i$ on the right hand side make up the unknowns matrix x, and y, on the left hand side make up the known matrix y.

x and y in this context express a linear algebra matrix relation Ax=y. Now, use any matrix solver to find the unknown matrix x using the standard least-squares curve fit approach. Other methods may also be suitable.

It is understood that the above linear equations template is extendable by more or fewer a coefficients and/or more or fewer b coefficients, essentially implementing a ratio of two polynomials.

Using the linear equations shown above matching the implementation structure in FIG. 2, we can effectively model the plant.

Given a measured or otherwise known system response to a series of inputs, postulate the existence of a plant impulse response that can be modeled using the linear equations above with some number of numerator coefficients a and some number of denominator coefficients b. This system can be described as:

$$\text{error} * \frac{Cnum}{Cden} * \text{integrator} * \frac{Pnum}{Pden} = f \quad (13)$$

$$\text{error} * Cnum * \frac{Pnum}{Pden} = df * Cden$$

Where error represents the error input, Cnum represents the Compensator numerator, Cden represents the Compensator denominator, Pnum represents the Plant numerator, Pden represents the Plant denominator, and $df$ represents the derivative of $f$. The compensator used for the system response may initially arbitrarily be chosen so that the system response produces numerical significance for the matrix solver while remaining within bounds (the input to the plant is in a valid input range and the output of the plant is in a valid output range).

Let x=error*Cnum represent the input sequence, and let y=df*Cden represent the output sequence. Then $$x * \frac{Pnum}{Pden} = y \quad (14)$$

Arrange into matrix form and use a matrix solver to find the best fit numerator coefficients a and denominator coefficients b that satisfactorily model the plant. The number of coefficients for both a and b are initially arbitrarily chosen and the computation is repeated and compared to the original system response, varying the number of a and b coefficients until a satisfactory model is achieved. This may be determined by "goodness of fit" or other criteria. Using the plant model determined above, we can now compute a compensator. The number of compensator coefficients can be explicitly defined as desired, and then a best fit determined. As an example, suppose we define a desired output function $f$ that is an exponential. Then using the system described above:

$$\text{error} * \frac{Cnum}{Cden} * \text{integrator} * \frac{Pnum}{Pden} = f \quad (15)$$

$$\text{error} * Pnum * \frac{Cnum}{Cden} = df * Pden$$

Let x=error*Pnum represent the input sequence, and let y=df*Pden represent the output sequence. Then $$x * \frac{Cnum}{Cden} = y \qquad (16)$$

Arrange into matrix form and use a matrix solver to find the best fit numerator coefficients a and denominator coefficients b. Alternatively, we could use the scaled reciprocal of the plant model as a compensator to avoid using a solver.

In the case where we define a desired input function g that perhaps satisfies acceleration or jerk requirements of a mechanical system, we can compute the output function $f$ as $$f = g * \frac{Pnum}{Pden} \qquad (17)$$

Then proceed as if $f$ is the defined output function as shown above. In both cases, $f$ and g are not limited to exponentials or other common functions, and may be arbitrary sequences.

A series of one or more candidate compensators can be computed by varying the number of numerator and denominator coefficients. Then using the system model determined above, we can evaluate the system performance of each candidate compensator and estimate overshoot and oscillation which can be done conveniently using a graphical visualization tool. Recall that error represents the error input, which is further defined as error=setpoint−feedback. Model the complete system, including the candidate compensator and the determined system model as $$\text{error} * \frac{Cnum}{Cden} * \text{integrator} * K_{gain} * \frac{Pnum}{Pden} = f \qquad (18)$$

The setpoint sequence is then determined which could be a single step from some starting point to some ending point, or a series of steps, or an arbitrary sequence. Then using this setpoint sequence, the system performance can then be evaluated in terms of overshoot, oscillation, time to achieve 90% of the defined setpoint, or other criteria. System stability and plant input range can also be evaluated by varying total system gain $K_{gain}$ or the output function $f$ or the setpoint sequence.

When in-system on-the-fly adaptive adjustment of the compensator is desired, as might be the case when there is a change in the system load, re-compute the plant model as shown above, then re-compute the new compensator as shown above. It is convenient (although not necessary) to use the most recent computed compensator to collect new system response data and remodel the plant and compute the next compensator.

When in-system on-the-fly adjustment of the compensator is not desired, one possible strategy might be to repeatedly increase the number of coefficients in the plant model and use the scaled reciprocal of the plant model as the new system response compensator and repeatedly collect a new system response. After the final iteration, the compensator is then computed as shown above.

If plant input Pin is known then $$\text{error} * \frac{Cnum}{Cden} * \text{integrator} = Pin \qquad (19)$$

and $$\text{error} * \frac{Cnum}{Cden} = dPin \qquad (20)$$

It is understood that the above relationships can be manipulated, and are still considered to be substantially equivalent alternate forms.

ACTIVE COMPENSATORS

Definitions plant=the thing to be controlled, which includes the "load"
x=actual or desired plant input values
y=actual or desired plant output values
active compensator=directly computes plant inputs from knowledge of plant behavior, previous plant inputs and outputs, and desired plant outputs
DFT=Discrete Fourier Transform Smoothstep: $S(t) = 3t^2 - 2t^3$ Smootherstep: $S(t) = 6t^5 - 15t^4 + 10t^3$ Sigmoid: $S(t) = \frac{1}{1 + e^{-t}}$ The Big Picture Determine an approximation of a plant model using known plant inputs and outputs. Periodic or non-periodic sequences may be specified as the desired plant output sequence to determine the plant input sequence. Patterns that are periodic in nature, but may vary in shape and timing may be identified by correlation or other method and then used as the desired plant output sequence to determine the plant input sequence. When specifying the desired plant output sequence, undesired frequency content, or frequency content that cannot be reproduced by the plant, may be removed by DFT, or other method.

Real-time or non-real-time computation may be used.

An active compensator performs direct computation of system input from previous plant inputs and outputs, and desired plant outputs.

Non-periodic plant output may be constant, linear ramp, sigmoid, smoothstep, smootherstep, exponential, or other arbitrary sequence.

Non-varying Periodic plant output may be periodic functions such as sine, or other arbitrary periodic sequence.

Varying periodic plant output may be heartbeat, breath, or other arbitrary sequence. Correlation or other method may be used to determine the plant output sequence. Identify and lock onto repeating patterns to predict future values using correlation or other method.

The Basic Cycle

Figure 3:
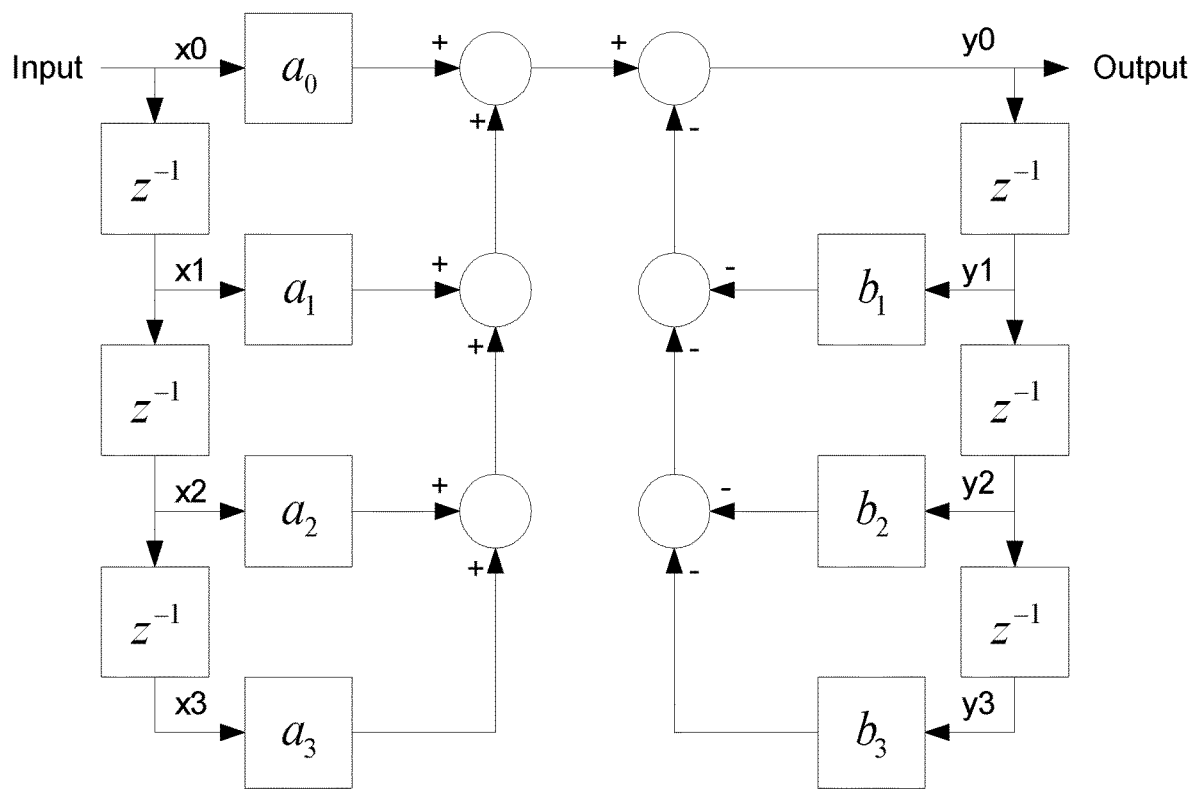
FIG. 3 is an exemplary embodiment showing another template of a digital compensator implementation structure.

FIG. 3 shows a general implementation of a plant model, where $x_n$ represents the input sequence, $a_n$ represents the coefficients applied to $x_n$, $y_n$ represents the output sequence and $b_n$ represents the coefficients applied to $y_n$.

The following set of linear equations may be stated using the diagram in FIG. 3, where $x_0$ and $y_0$ now represent the oldest input and output in the sequence.

$$
\begin{aligned}
y_0 &= a_0 x_0 \\
y_1 &= a_0 x_1 + a_1 x_0 & -b_1 y_0 \\
y_2 &= a_0 x_2 + a_1 x_1 + a_2 x_0 & -b_1 y_1 & -b_2 y_0 \\
y_3 &= a_0 x_3 + a_1 x_2 + a_2 x_1 + a_3 x_0 & -b_1 y_2 & -b_2 y_1 & -b_3 y_0 \\
y_4 &= a_0 x_4 + a_1 x_3 + a_2 x_2 + a_3 x_1 & -b_1 y_3 & -b_2 y_2 & -b_3 y_1 \\
y_5 &= a_0 x_5 + a_1 x_4 + a_2 x_3 + a_3 x_2 & -b_1 y_4 & -b_2 y_3 & -b_3 y_2 \\
y_6 &= a_0 x_6 + a_1 x_5 + a_2 x_4 + a_3 x_3 & -b_1 y_5 & -b_2 y_4 & -b_3 y_3 \\
&\ldots
\end{aligned} \quad (21)
$$

It is understood that the above linear equations template (21) is extendable by more or fewer a coefficients and/or more or fewer b coefficients.

In the set of linear equations shown in (21) above, the plant input sequence is known, the plant output sequence is known, and the coefficients are unknown. A matrix solver or other method may be used to determine the coefficients of the plant model.

In general, everywhere using a matrix solver to determine a solution set is proposed, least-squares curve fit, weighting, or other strategies may be employed.

In each step, the measured plant output $y_n$ becomes the newest element of the output sequence, the system model is computed, the next $x_{n+1}$ is computed from the plant model and the desired output. $x_{n+1}$ is then given to the plant as input, and becomes the newest element of the plant input sequence.

Rearrange the set of linear equations (21) shown above, to get the following:

$$
\begin{aligned}
y_0 &= a_0 x_0 \\
y_1 &= a_1 x_0 + a_0 x_1 & -b_1 y_0 \\
y_2 &= a_2 x_0 + a_1 x_1 + a_0 x_2 & -b_1 y_1 & -b_2 y_0 \\
y_3 &= a_3 x_0 + a_2 x_1 + a_1 x_2 + a_0 x_3 & -b_1 y_2 & -b_2 y_1 & -b_3 y_0 \\
y_4 &= a_3 x_1 + a_2 x_2 + a_1 x_3 + a_0 x_4 & -b_1 y_3 & -b_2 y_2 & -b_3 y_1 \\
y_5 &= a_3 x_2 + a_2 x_3 + a_1 x_4 + a_0 x_5 & -b_1 y_4 & -b_2 y_3 & -b_3 y_2 \\
y_6 &= a_3 x_3 + a_2 x_4 + a_1 x_5 + a_0 x_6 & -b_1 y_5 & -b_2 y_4 & -b_3 y_3
\end{aligned} \quad (22)
$$

Now, suppose that $y_5$ and $y_6$ are the next two desired outputs, and $x_5$ and $x_6$ are the next two plant input values that produce the desired output. From (22) above, the following two linear equations could be setup.

$$
\begin{aligned}
y_5 &= a_3 x_2 + a_2 x_3 + a_1 x_4 + a_0 x_5 & -b_1 y_4 & -b_2 y_3 & -b_3 y_2 \\
y_6 &= a_3 x_3 + a_2 x_4 + a_1 x_5 + a_0 x_6 & -b_1 y_5 & -b_2 y_4 & -b_3 y_3
\end{aligned} \quad (23)
$$

In this set of linear equations (23), the plant input sequence previous to $x_5$ and $x_6$ is known. The plant output sequence is known prior to $y_5$ by measurement. The plant output sequence starting at $y_5$ is known as the desired plant output. The coefficients are also known. A matrix solver or other method may be used to determine $x_5$, which now becomes the next value in the plant input sequence.

EXAMPLE

Figure 5:
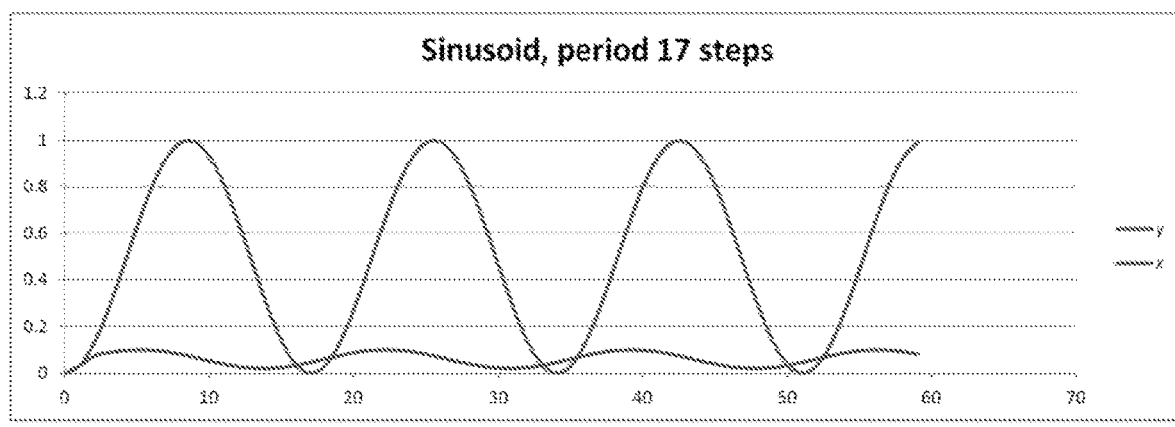
FIG. 5 is a table showing a plant model computed using the data set shown in Table 1.

In the following example, a sinusoid is selected with a period of seventeen (17) steps. The input and output history is initially zeros. A known system is used to generate the example data shown in Table 1. Since all values of this data set are known in advance, the basic cycle of measuring plant output, computing a new plant model, and computing the next plant input can be checked against this known data set. Following is the known data set, which matches the first complete period of the chart below (FIG. 5).

Known periodic data set:

TABLE 1

| Step | x | y |
|---|---|---|
| 0 | 0 | 0 |
| 1 | 0.033764 | 0.033764 |

TABLE 1-continued

| Step | x | y |
|---|---|---|
| 2 | 0.076165 | 0.130496 |
| 3 | 0.09048 | 0.277131 |
| 4 | 0.099444 | 0.453866 |
| 5 | 0.103263 | 0.636831 |

TABLE 1-continued

| Step | x | y |
|---|---|---|
| 6 | 0.101502 | 0.801317 |
| 7 | 0.094403 | 0.925109 |
| 8 | 0.082925 | 0.991487 |
| 9 | 0.068619 | 0.991487 |
| 10 | 0.053417 | 0.925109 |
| 11 | 0.039371 | 0.801317 |
| 12 | 0.028379 | 0.636831 |
| 13 | 0.021926 | 0.453866 |
| 14 | 0.020882 | 0.277131 |
| 15 | 0.025389 | 0.130496 |
| 16 | 0.034838 | 0.033764 |
| 17 | 0.047953 | 0 |

In this example, the end of 8 cycles is chosen to compute a plant model, and compute the correct $x_9=0.068619$ that produces the desired $y_9=0.991487$ in step 9 (refer to Table 1).

Following is historical data after eight (8) steps:

TABLE 3

| step | x | y |
|---|---|---|
| 3 | 0.090479528 | 0.277130822 |
| 4 | 0.099443994 | 0.45386582 |
| 5 | 0.103262914 | 0.636831495 |
| 6 | 0.101501678 | 0.801317318 |
| 7 | 0.094402806 | 0.925108568 |
| 8 | 0.082925305 | 0.99148655 |

Using the linear equation template shown in the set of linear equations (21) above and the historical data shown in Table 3, populate the two matrices:

| y= |
|---|
| 0.636831495 |
| 0.801317318 |
| 0.925108568 |
| 0.99148655 |

TABLE 4

| A= | | | |
|---|---|---|---|
| 0.103262914 | 0.099443994 | −0.45386582 | 0.277130822 |
| 0.101501678 | 0.103262914 | 0.636831495 | −0.45386582 |
| 0.094402806 | 0.101501678 | 0.801317318 | 0.636831495 |
| 0.082925305 | 0.094402806 | 0.925108568 | 0.801317318 |

Solve for the coefficients $a_0=1.00012643021039$, $a_1=-0.057516651921258$, $b_1=-1.666489560494910$, and $b_2=0.783339212477947$ using a matrix solver or other method.

Using the linear equation template shown in the set of linear equations (21), historical data shown in Table 1, and the coefficients just computed, populate the two matrices:

| Y= |
|---|
| 0.103275969 |
| 0.095575174 |

| A= | |
|---|---|
| 1.00012643 | 0 |
| −0.057516652 | 1.00012643 |

Solve for the next plant input value $x_9=0.068619292462854$, which matches the expected $x_9$ value from the known data set shown in Table 1 to nine (9) digits of precision.

In summary, the systems and methods described herein may facilitate the design of compensators and/or controlling response of various plants using such compensators. Optionally, any of the embodiments herein may include one or more of the following features:

System response data may be collected in-system without disturbing or altering the system, or estimated by mathematical model, or other means.

If required, the plant may be linearized by using direct computation, curve fit of acquired data, table lookup, or other means. After linearization, system response data is acquired again.

Using system response data, a system model may be constructed that is representative of the system response.

Using the system model, a compensator may be computed to meet specific design goals.

Compensators may be computed once prior to deployment or during system operation as desired (adaptive).

Compensators can be computed to produce a desired plant output, which may be conveniently exponential, or Smooth-step, or other function, or an arbitrary sequence.

Compensators can be computed to produce a desired plant input, as might be the case when attempting to control acceleration and jerk, which may be conveniently Smooth-step, or other function, or an arbitrary sequence.

Compensators may be computed explicitly to contain some defined number of a and/or b coefficients, as desired.

Compensator coefficients may be approximated by different combinations of a and/or b coefficients, as desired.

Compensators may be computed to manage or eliminate overshoot and oscillation.

Compensators may be constructed that rely upon a very limited setpoint change for higher performance compared to compensators that allow unrestricted setpoint change. These compensators can achieve the new setpoint on the next step.

Setpoint slewing may be used in combination with any compensator, and is advantageously used with compensators that rely upon limited setpoint change.

Alternatively, error limiting may be used in combination with any compensator to effectively limit the setpoint change and achieve higher performance.

Compensator complexity can be shifted upstream to the setpoint input, where a function upstream of the setpoint input may specify a desired plant output sequence, and then a simpler, higher performance compensator can track the setpoint to implement the desired plant output.

Multiple compensators can be computed for multiple load conditions, so that in cases where it is possible to receive advance notice that a load change is coming, the system may replace a one set of compensator coefficients based on the current load, with a second set of compensator coefficients based on the new load. The system may then operate immediately using the new coefficients that are optimized for the new load.

The plant model can be considered to be a "system signature" which can be used as a diagnostic to detect imminent system failure.

The system signature can be used for patient diagnostics whereby the signature may indicate the state of health or condition of the patient.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for designing a compensator for controlling a plant, comprising:
   a) introducing a predetermined input into the plant;
   b) measuring an impulse response of the plant responding to the predetermined input;
   c) determining a mathematical model for the plant based at least in part on the impulse response of the plant, the mathematical model for the plant comprising a first ratio of polynomials including a first set of coefficients; and
   d) determining a second ratio of polynomials including a second set of coefficients for the compensator based at least in part on the first set of coefficients to operate the compensator such that the compensator produces a series of plant inputs to move the plant towards a setpoint according to a predetermined plant output.

2. The method of claim 1, wherein the second set of coefficients is determined such that the plant output is one of an exponential response or a Smoothstep response or other desired plant input or plant output.

3. The method of claim 1, wherein the second ratio of polynomials is determined to control one or more of overshoot, oscillation, time to reach percent of desired output, frequency response, shape of plant input values, and shape of plant output values of the plant output or other desired criteria.

4. The method of claim 1, wherein the mathematical model for the plant is determined by one of linear least squares curve fit using a matrix solver, or convolution and deconvolution, or other equivalent method.

5. The method of claim 1, further comprising limiting the compensator to keep plant inputs within a valid input range.

6. The method of claim 1, wherein the plant is one of a mechanical system, an electrical system, a chemical system, or any system or combination of systems.

7. The method of claim 1, wherein the mathematical model for the plant is based on one of i) the actual impulse response of the plant; and/or ii) a mathematical model that approximates the actual impulse response of the plant.

8. The method of claim 1, wherein the second set of coefficients is determined by linear least squares curve fit using a matrix solver, or convolution and deconvolution, or other equivalent method.

9. The method of claim 1, wherein the second set of coefficients is determined using the scaled reciprocal of the plant model.

10. The method of claim 1, wherein the second set of coefficients are determined by truncating the number of coefficients used in the second set of coefficients to be less than the number of coefficients in the first set of coefficients to determine a candidate compensator using n coefficients where n is a positive integer.

11. The method of claim 10, wherein n=2 to determine a candidate PI compensator.

12. The method of claim 10, wherein n=3 to determine a candidate PID compensator.

13. The method of claim 1, wherein the first ratio of polynomials including a first set of coefficients is of the form $$\frac{[a_0 \ a_1 \ a_2 \ ...]}{[b_0 \ b_1 \ b_2 \ ...]}.$$

14. The method of claim 1, wherein the second set of coefficients is a scaled reciprocal of the first set of coefficients.

15. A system for operating a plant, comprising:
   a setpoint interface configured to provide a setpoint to the plant;
   a feedback structure communicating between a plant output of the plant and the setpoint interface;
   a compensator receiving the setpoint from the setpoint interface and operating on the setpoint and feedback from the plant to provide a series of plant inputs to the plant to provide a desired plant input or desired plant output;
   a module providing a set of compensator coefficients for setting operation of the compensator determined using the steps:
      a) introducing a predetermined input into the plant;
      b) measuring an impulse response of the plant responding to the predetermined input;
      c) determining a mathematical model for the plant based at least in part on the impulse response of the plant, the mathematical model for the plant comprising a first ratio of polynomials including a first set of coefficients; and
      d) determining a second ratio of polynomials including a second set of coefficients for the compensator based at least in part on the first set of coefficients to operate the compensator such that the compensator produces a series of plant inputs to move the plant towards a setpoint according to a predetermined plant output.

16. The system of claim 15, further comprising an integrator communicating between the compensator and the input of the plant.

17. The system of claim 16, wherein the integrator is configured to substantially eliminate steady-state error in the system.

18. The system of claim 15, further comprising an optional gain block for providing a desired reduction on the input to the compensator from the setpoint interface.

19. A system for operating a plant, comprising:
   a setpoint interface configured to provide a setpoint to the plant;
   a feedback structure communicating between a plant output of the plant and the setpoint interface;
   a compensator receiving the setpoint from the setpoint interface and operating on the setpoint and feedback from the plant to provide a series of plant inputs to the plant to provide a desired plant output;
   a module providing a set of compensator coefficients for setting operation of the compensator under different loads:
      a) introducing a predetermined input into the plant under different loads;
      b) measuring an impulse response of the plant responding to the predetermined input under each of the different loads;

c) determining a mathematical model for the plant based at least in part on the impulse response of the plant under each of the different loads, the mathematical model for the plant comprising a first ratio of polynomials including a first set of coefficients corresponding to each of the different loads; and d) determining a second ratio of polynomials including a second set of coefficients for the compensator based at least in part on the first set of coefficients to operate the compensator under each of the different loads, thereby providing a plurality of the second set of coefficients corresponding to different loads; and a controller for receiving load information regarding the plant, the controller operating the compensator using one of the plurality of the second set of coefficients based on the load information such that the compensator produces a series of plant inputs to move the plant towards a setpoint according to a predetermined plant output.

20. The system of claim 19, further comprising a user interface for entering load information regarding the plant, the user interface coupled to the controller for providing the load information from the plant.

\* \* \* \* \*